United States Patent Office.

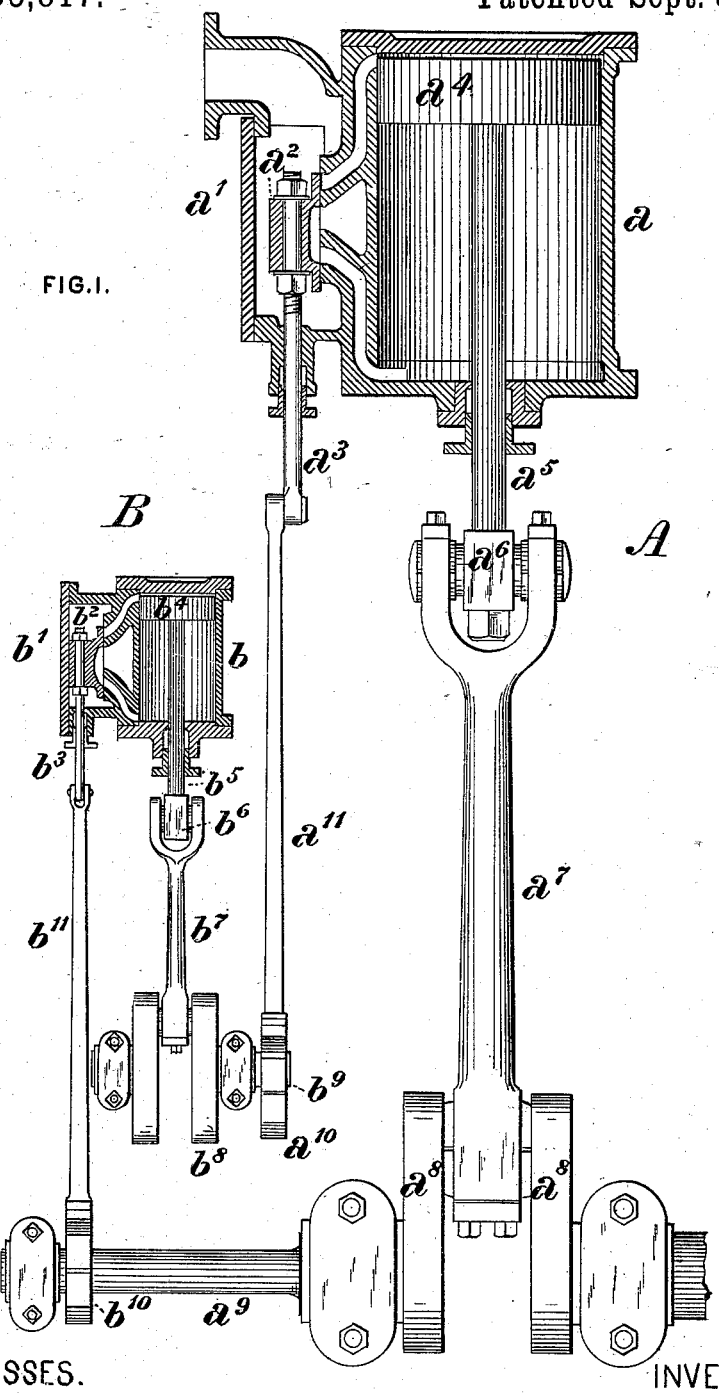

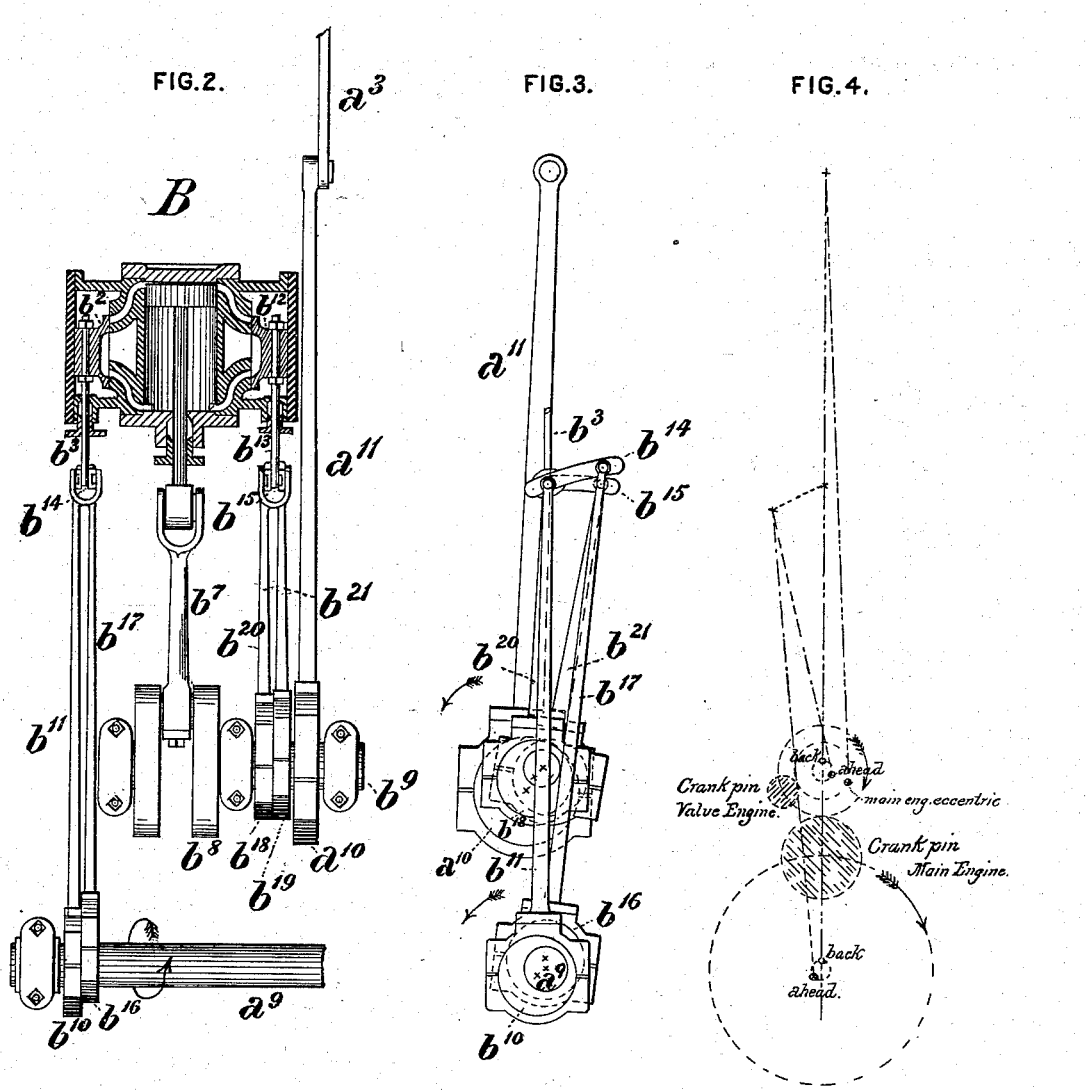

HORACE SEE, OF PHILADELPHIA, PENNSYLVANIA.

VALVE-GEAR.

SPECIFICATION forming part of Letters Patent No. 263,817, dated September 5, 1882.

Application filed May 9, 1882. (No model.)

*To all whom it may concern:*

Be it known that I, HORACE SEE, of the city and county of Philadelphia, in the State of Pennsylvania, have invented certain new and useful Improvements in Valve-Gear for Steam-Engines, of which improvements the following is a specification.

The object of my invention is to enable the valves of steam-engines to be so operated that greater regularity of speed may be assured and more convenient and desirable means for starting, stopping, and reversing be afforded than are practicable under the ordinary constructions.

To these ends my improvements consist in the combination of a main engine and a subsidiary or auxiliary engine which operates the valve or valves of the main engine; also, in the combination of a main engine, an auxiliary engine operating the valve or valves thereof, a driving-valve operated by a link connected to a pair of eccentrics on the main engine shaft, and a reversing-valve operated by a link connected to a pair of eccentrics on the auxiliary engine shaft.

The improvements claimed are hereinafter more fully set forth.

In the accompanying drawings, Figure 1 is a longitudinal central section through a steam-engine embodying my invention as arranged to run in one direction only; Fig. 2, a similar section through the auxiliary or valve engine thereof as arranged to constitute a reversing-engine—that is, one that can be run in either direction; Fig. 3, a side view in elevation of the valve-gear of Fig. 2 as seen from the left, and as in head motion; and Fig. 4, a diagram illustrating the position of the parts in back motion.

The main engine A, to which my invention is herein shown as applied, is *per se* of the ordinary single-cylinder double-acting rotative class, having a cylinder, $a$, steam-chest $a'$, slide-valve $a^2$, valve-stem $a^3$, piston $a^4$, piston-rod $a^5$, cross-head $a^6$, connecting-rod $a^7$, crank $a^8$, and crank-shaft $a^9$. As none of these members, however, need be limited to any specific construction, their detailed description will not be necessary herein.

In lieu of operating the valve $a^2$ of the main engine A by an eccentric or eccentrics upon the shaft of said engine, as is ordinarily the case, I provide for this purpose an auxiliary, subsidiary, or valve engine, B, which may have either one or a pair of cylinders, and as here illustrated is substantially similar in construction to the main engine, but of smaller dimensions, embodying a double-acting cylinder, $b$, steam-chest $b'$, slide-valve $b^2$, valve-stem $b^3$, piston $b^4$, piston-rod $b^5$, cross-head $b^6$, connecting-rod $b^7$, crank $b^8$, crank-shaft $b^9$, eccentric $b^{10}$, and eccentric-rod $b^{11}$. The cranks $a^8$ of the main engine and $b^8$ of the valve-engine are set so that the movements of the two engines will be similar, and the eccentric $b^{10}$ of the valve-engine is secured upon the shaft $a^9$ of the main engine in a similar position relatively to the crank thereof to that which would be occupied by an eccentric as ordinarily employed, to operate the valve $a^2$ of the main engine, which valve is, under my invention, operated by an eccentric, $a^{10}$, secured upon the shaft of the valve-engine, said eccentric being of such throw as to impart the desired travel to the valve, and being connected to the stem $a^3$ thereof by an eccentric-rod, $a^{11}$. The sole duty of the valve-engine being to operate the valve of the main engine, the valve-engine thus works under a constant load, and therefore any sudden change in the load of the main engine cannot operate the correspondingly sudden change in the speed thereof which would be occasioned if the main-engine valve was operated by an eccentric on the main-engine shaft, as in the ordinary manner. Moreover, by the employment of a governor or regulator driven from the shaft of the valve-engine and acting to control the supply of steam thereto the speed of the main engine may be maintained practically constant at an adjusted rate.

For a reversing-engine—that is to say, one having the capacity of rotation in either direction at pleasure as in marine, winding, or rolling-mill service—the construction illustrated in Figs. 2, 3, and 4 is employed. In such case the valve-engine B is fitted with two valves, $b^2$ $b^{12}$, which are equal in joint capacity to the requirements of distribution of steam to the cylinder $b$, and which may be termed respectively a "driving-valve" and a "reversing-valve." The stem $b^{13}$ of the reversing-valve $b^{12}$ is connected to a block which fits on a reversing-link, $b^{15}$, connected to the rods $b^{20}$ $b^{21}$ of eccentrics $b^{18}$ $b^{19}$, secured upon the shaft $b^9$ of the valve-engine at proper angles with the crank for head and for back motion, respectively. The stem $b^3$ of the driving-valve $b^2$ is similarly connected to the block of a link, $b^{14}$, operated for head or for back motion, respectively, by the rods $b^{11}$ $b^{17}$ of eccentrics $b^{10}$ $b^{16}$, secured on the shaft $a^9$ of the main engine at angles to the crank thereof which are as follows: The going-ahead eccentric $b^{10}$ is set at the same angle with the crank of the main engine as the going-ahead eccentric $b^{18}$ and the main eccentric $a^{10}$ occupy relatively to the crank of the valve-engine. The backing-eccentric $b^{16}$ is set so that when the valve-engine has been reversed and moved so far as to bring the eccentric $a^{10}$ of the main engine from the going-ahead to the backing position the eccentric $b^{16}$ will stand in the same position relatively to the crank of the valve-engine as does the backing-eccentric $b^{19}$ to said crank, and consequently both the driving and the reversing valves and both the main and the valve engines will be coincidently operated in one or the other direction, accordingly as the links may be placed by the engineer, said links being governed by the usual reversing levers and segments.

In the operation of reversing the main engine the link $b^{14}$ of the driving-valve $b^2$ is first placed in mid position. The link $b^{15}$ of the reversing-valve $b^{12}$ is then shifted into the position corresponding to the desired direction of motion of the main engine, and afterward the link $b^{14}$ of the driving-valve $b^2$ is similarly shifted.

The speed of the valve-engine may be regulated by a governor attachment to the reversing-links or to a valve in the steam-pipe, and a cut-off valve or valves may be applied in connection with the main-engine cylinder and be worked from the shaft of the valve-engine.

The application of my invention to marine engines enables the expensive and heavy link and eccentric mechanism, including the steam reversing-gear, which has been heretofore necessary for operating the valves to be dispensed with, and the valve-engine may be readily adapted to the additional service of working the pumps and of being geared to the engine-shaft so as to turn the engine over in port when required.

I am aware that a subsidiary engine has been heretofore employed to move the valves of a main engine when "unhooked," and also as a regulator of the speed of a main engine, its action in the latter case being to vary the position of an eccentric on the main-engine shaft under changes of speed thereof; and I do not therefore broadly claim the combination of a main engine and a subsidiary engine operating a valve or valves.

I claim as my invention and desire to secure by Letters Patent—

1. The combination, substantially as set forth, of a main steam-engine and an auxiliary or valve engine, said auxiliary engine driving a shaft which operates the distribution-valve of the main engine and having its own distribution-valve operated by the shaft of the main engine.

2. The combination, substantially as set forth, of a main steam-engine, an auxiliary or valve engine which operates the distribution-valve of the main engine, and two pairs of reversing-links and eccentrics, each operating a distribution-valve upon the auxiliary engine and receiving movement respectively from the main and from the auxiliary engine shafts.

HORACE SEE.

Witnesses:
J. SNOWDEN BELL,
MATHIAS SEDDINGER.